Dec. 8, 1953   G. R. MYERS   2,661,631
CABLE TENSION COMPENSATING AND REGULATING APPARATUS
Filed June 22, 1949   2 Sheets-Sheet 1

Gene R. Myers
*INVENTOR.*

BY
HIS PATENT ATTORNEY.

Dec. 8, 1953  G. R. MYERS  2,661,631
CABLE TENSION COMPENSATING AND REGULATING APPARATUS
Filed June 22, 1949  2 Sheets-Sheet 2

Gene R. Myers
*INVENTOR.*

BY *James M. Clark*

HIS PATENT ATTORNEY.

Patented Dec. 8, 1953

2,661,631

UNITED STATES PATENT OFFICE 2,661,631

CABLE TENSION COMPENSATING AND REGULATING APPARATUS

Gene R. Myers, Seattle, Wash., assignor to Boeing Airplane Company, a corporation of Delaware Application June 22, 1949, Serial No. 100,614

20 Claims. (Cl. 74—501.5)

The present invention relates generally to control systems and more particularly to cable tension compensating and regulating means for control systems for aircraft, ships and other vehicles.

In the operation of aircraft and similar vehicles, it has been found desirable to transmit control forces over relatively long distances for the operation of movable surfaces and other parts, and accordingly control systems utilizing flexible cables for the transmission of forces to such movable parts by tensile pull have come into wide and extensive use. Many of these vehicles and particularly aircraft, are often subjected to sudden and extreme changes in temperature with the result that the main supporting structure frequently expands or contracts to a different extent than the cables in the control system. Such changes in dimension are frequently due to temperature variations and may be contributed to, to a great extent, by the differences, in the materials of the supporting structure and of the cable, such materials having different coefficients of expansion as a result of which the linear expansion and retraction of one may be considerably greater or lesser than that of the other, even though they may be subjected to the same temperature changes. Aircraft structures are also subjected to dimensional changes due to deflections under varying load conditions and these loads may arise either from the application of aerodynamic forces, the release or consumption of disposable loads carried by the vehicle, or from other causes.

In order to maintain a predetermined tension within such control cables they are frequently provided with an initial pre-stressing, or a rigging tension, as measured by a tensiometer or like device and the present invention is directed to an improved compensating means for maintaining the initial cable rigging tension at a uniform or constant magnitude under all of the service conditions to which the vehicle and the control system are subjected. The present invention is accordingly directed to an improved control cable tension compensator which adjusts the rigging load while the system is under its control load and in this and other respects it constitutes an improvement over most compensating devices which have been proposed and utilized heretofore.

It is, accordingly, a primary object of the present invention to provide an improved control system, and more particularly a cable tension compensating and regulating means for the control systems for aircraft, ships and other vehicles. It is a further object to provide a cable tension compensating means which maintains a predetermined rigging tension within the control cables of a control system. It is a further object to provide an improved compensating means for maintaining the initial cable rigging tension at a uniform and constant magnitude under all of the service conditions to which the control system may be subjected. A further object of this invention resides in the provision of an improved control cable tension compensating means which adjusts the rigging load while the cable system is under its control load. It is a still further object of the present invention to provide such a cable tension compensating means which is automatically operated and in which the forces within the compensating means are sensed and transmitted by hydraulic or other fluid means in a relatively simplified and foolproof arrangement, and by the cooperation of the respective components of the compensating system.

Other objects and advantages of the present invention will occur to those skilled in the art after reading the following description, taken in conjunction with the accompanying drawings forming a part hereof, in which.

Figure 1:
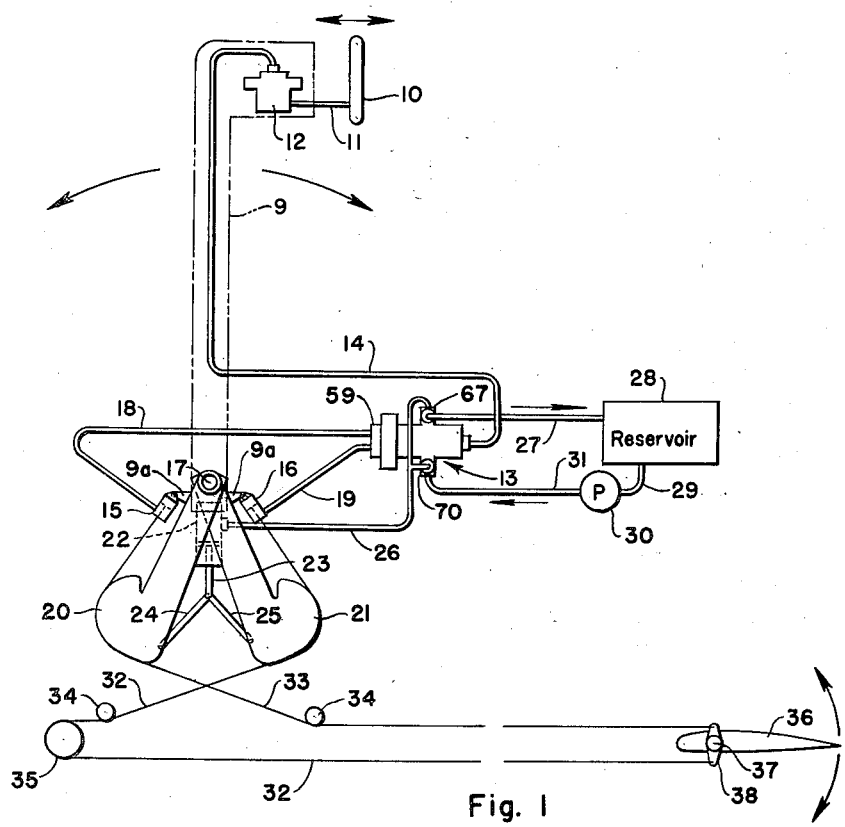
Fig. 1 is a diagrammatic view of a cable control system for a movable control surface to which a form of the present tension compensating means has been applied.

Referring now to Fig. 1 showing the diagrammatic view of the cable control system and the compensating and regulating means applied thereto, the numeral 9 represents the control column of the control system of an aircraft upon which is mounted the control wheel 10 for the movement of an elevator (or other control surface) by manual rocking of the column 9 about its pivotal axis 17. The control wheel 10 is mounted upon a push-pull shaft or rod 11, which in turn is operatively connected to the load sensing hydraulic unit 12, which is shown in detail in Fig. 2. Hydraulic pressure built up within the load sensing cylinder 12 is transmitted by means of the fluid conduit 14 to the control valve 13, which is shown in detail in Figs. 3 and 4. Two cable tension sensing cylinders 15 and 16, shown in detail in Fig. 6 are disposed adjacent the pivotal mounting 17 and are fluidly connected to the control valve 13 by the conduits 18 and 19.

Adjacent its pivotal mounting 17, the control column 9 is provided with oppositely extending horns or lever portions 9a upon which the bifurcated terminals of the cable tension sensing cylinders 15 and 16 are pivotally mounted. Downwardly diverging quadrant arms 20 and 21 are also pivotally mounted for free movements about the axis of the pivotal mounting 17. An intermediate hydraulic tensioning cylinder 22 is disposed between the quadrant arms 20 and 21 for the purpose of increasing or decreasing the cable tension by spreading or approaching movements of the quadrant arms 20 and 21. The tensioning cylinder 22 is provided with a piston and piston rod assembly 23 at the lower terminal of which are pivotally connected the piston rod links 24 and 25 which diverge downwardly or outwardly toward their respective pivotal connections to the free ends of the quadrant arms 20 and 21. The outer edges of the latter are suitably arcuately curved and grooved to receive the control cables 33 and 32, which will be hereinafter more fully described.

The tensioning cylinder 22 is fluidly interconnected by means of the conduit 26 with the control valve assembly 13 which in turn is connected by the return line 27 to the reservoir 28 from which the pump 30 draws the hydraulic fluid through its suction line 29 and thence into the discharge or pressure supply line 31 to the control valve assembly 13. To the movable piston elements of the cable tension sensing cylinders 15 and 16 are attached the terminals of the control cables 33 and 32, respectively, these cables engaging the rounded outwardly facing grooved portions of the quadrant arms 20 and 21. Accordingly, as the quadrant arms 20 and 21 are spread outwardly by increased pressure within the tensioning cylinder 22, the tension within the cables 33 and 32 is correspondingly increased, as is also the fluid pressure within the conduits 18 and 19 connected to the cable tension sensing cylinders 15 and 16, respectively. Conversely, as the tension may be increased within the control cables 32 and 33, the tendency to draw the quadrant arms 20 and 21 together produces an increased fluid pressure within the tensioning cylinder 22 which is transmitted through the fluid conduit 26 to both the pressure and relief sides of the control valve 13.

The control cables 32 and 33 are crossed as they leave the quadrant arms 20 and 21 and extend around the idler sheaves 34, the forwardly extending cable run 22 extending around the sheave 35 and thence rearwardly to the control horn 38 fixedly attached to the elevator surface 36, which in turn is pivotally mounted for rotation about the horizontal pivot axis 37. The other run or strand of the cable 33 also is guided beneath the idler sheave 34 and is attached to the opposite or upper terminal of the control horn 38 to cooperate with the lower cable run 32 in adjusting the control surface 36 about its pivot.

Figure 2:
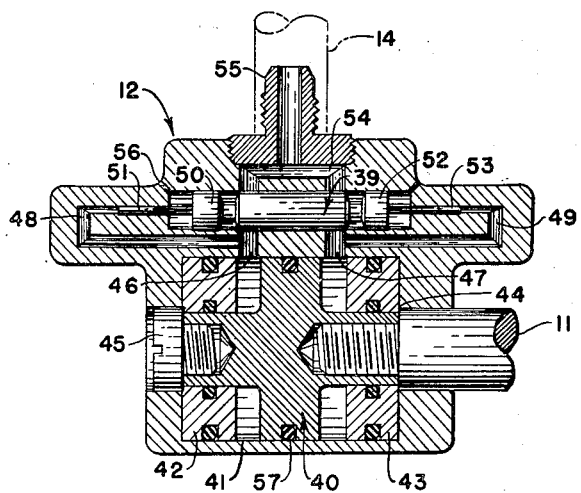
Fig. 2 is a cross-sectional detail view of a load sensing means as utilized in the system of Fig. 1.

Referring now to Fig. 2, which shows the load sensing unit 12 to which the push-pull rod 11 is operatively connected, it will be noted that the inner terminal of the push-pull rod 11 is threadedly connected to a double acting piston 40 reciprocable within the cylinder or chamber 41. The cylinder 41 is provided at each end with annular or floating pistons 42 and 43 which are slidably mounted for movement in the axial direction of the piston rod 11 about the extended hub portions of the piston 40. It will be noted that the diameter of the push-pull rod 11 is somewhat greater than the axially extended hub portion of the piston 40 into which the push-pull rod is threaded to thereby form a transverse shoulder 44 which bears against the outer face of the floating annular piston 43 for carrying the floating piston toward the center of the cylinder 41 when the push-pull rod 11 is moved inwardly or toward the left as viewed in Fig. 2. Similarly, the opposite axially extending portion of the piston 40 is internally threaded and provided with a threaded cap element 45 which is also of greater diameter than the axially extended piston portion to carry its floating piston 42 inwardly toward the middle of the cylinder 41 as the push-pull rod 11 and its attached piston 40 is moved from left to right as viewed in Fig. 2. In other words, as the piston 40 is moved toward the left, the floating piston 43 is carried to the left with it but the opposite floating piston 42 remains in its original or terminal position. Conversely, as the piston 42 moves toward the right, it carries the floating piston 40 in the same direction with it, whereas the opposite floating piston 43 remains in the terminal position shown in Fig. 2.

The cylinder 41 is connected, at the opposite faces of the piston 40, by the passages or ports 46 and 47 with the sliding selector valve assembly 39. The fluid passages 46 and 47 also communicate respectively with the passages 48 and 49, and the sliding valve assembly 39 is provided with outer land portions 50 and 52 which terminate in the guide pin portions 51 and 53, respectively. The opposite side of the sliding selector valve assembly 39 connects by means of the transverse passageway 54 with the main outlet fitting 55 in communication with the hydraulic conduit 14 extending to the control valve 13. The rear chambers of the cylinders within which the sliding selector valve 39 is reciprocable, are vented to the atmosphere by suitable passages 56. The main and floating pistons 40, 42 and 43 are provided with packing seals as at 57 to prevent leakage of fluid past these pistons.

Figure 4:
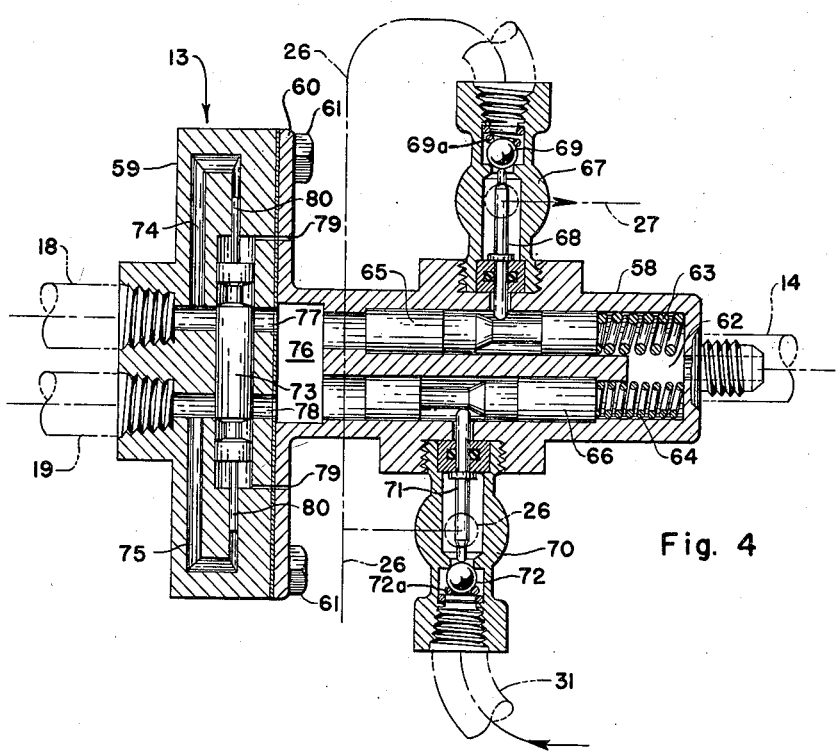
Fig. 4 is a sectional plan view of the same control valve as taken along the lines 4—4 of Fig. 3.
Figure 3:
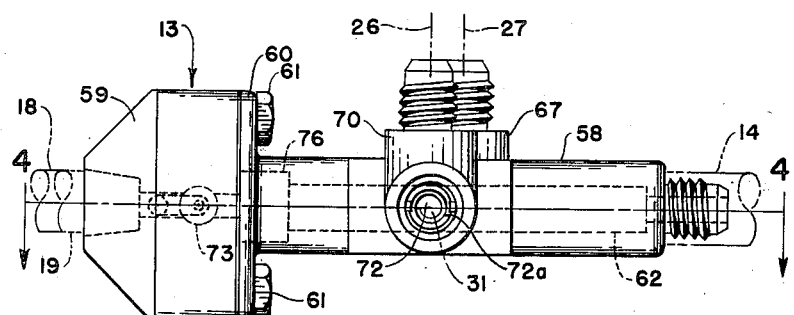
Fig. 3 is a side elevational view of the differential pressure control valve used in the system of Fig. 1.

Referring now to Figs. 3 and 4, the numeral 13 in these figures, designating the control valve assembly, is comprised primarily of the two valve casings 58 and 59. The valve casing 58 is formed with a flanged portion 60 suitably apertured for the bolts 61 by means of which the flange 60 of the valve casing 58 is secured to the valve casing 59. At one end of the valve casing 58 it is provided with a fluid chamber 62 within which are housed the compression springs 63 and 64. The interior of the valve casing 58 is provided with two longitudinal parallel bores within which the camming pistons 65 and 66 are arranged to reciprocate under the influence of fluid pressures to be described below and as opposed by the springs 63 and 64.

Threadedly attached at each side of the valve casing 58 are the relief valve body 67 and the pressure supply valve body 70. The relief valve body 67 is provided with a threaded connection at its outer terminal for communication with the fluid conduit 26, extending to the tensioning cylinder 22, and has a perpendicularly disposed branch outlet in communication with the conduit 27 comprising the return line to the reservoir 28. On the opposite side of the valve body 58, the pressure supply valve 70 is provided with a threaded connection at its outer terminal for the pressure supply line 31 and a perpendicularly disposed branch outlet in fluid communication with the fluid conduit 26 extending from the tensioning cylinder 22, being a branch of the same tensioning cylinder pressure line which connects with the outer terminal of the relief valve body 67. The camming piston 65 cooperates with the plunger 68 which operates at its outer end the ball valve 69. The camming valve 65 is shown in its leftmost position under the influence of the heavy compression spring 63 which urges the valve element 65 against the shoulder formed by the restricted diameter of the bore within valve body 58.

The camming piston element 66 on the other side of the control valve is shown in its outermost position against the shoulder provided by the restricted portion of the bore of the valve body 58, at which it is opposed by the lighter compression spring 64. It will be noted also that the taper or camming portion of this piston element 66 is opposite in direction to that of the piston element 65, such that as the pressure within the outer chamber 62, aided by the lighter compression spring 64, overcomes the fluid pressure within the inner or central chamber 76, the valve element 66 is caused to move inwardly or toward the left, thereby causing the plunger 71 to move outwardly to open the ball check valve 72 against the opposition of its spring 72a. As the pressure within the inner chamber 76 becomes greater than that of the spring 63 plus the fluid pressure in the outer chamber 62 the valve element 65 will be caused to move outwardly against the opposition of the spring 63 or toward the right in Fig. 4. As the valve element moves in this direction its camming portion causes the plunger 68 to move outwardly thereby opening the ball check valve 69 against the opposition of its spring 69a.

The valve body portion 59 houses a sliding selector valve assembly 73. The valve body is provided with suitable threaded connections for the pressure conduits 18 and 19 extending from the cable tension sensing cylinders 15 and 16. Such pressures are transmitted through the transverse passageways 74 and 75, as well as directly across the valve 73 into the central chamber 76 through the direct ports 77 and 78. The sliding selector valve 73 is provided at its opposite terminals with the guide pin or plunger portions 80 against the ends of which the fluid pressures within the passages 74 and 75 are adapted to operate. The spaces within the cylinder beyond the ends of the land portions of the sliding valve 73 are ventilated to the atmosphere through the vent passageways 79 at each end of this chamber.

Figure 5:
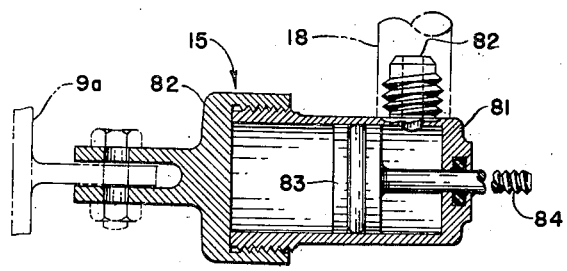
Fig. 5 is a cross-sectional view of one of the cable tension sensing elements of the compensating system.

Referring now to Fig. 5, the cable tension sensing cylinder 15 (which is identical with the cylinder 16 on the opposite side of the control column pivot 17) is comprised primarily of a cylinder portion 81, the open end of which is threadedly engaged by the cylinder head clevis terminal element 82. The latter is provided with an apertured bifurcated portion which engages the control column bracket 9a referred to above and upon which it is pivotally mounted. The opposite or closed end of the cylinder portion 81 is suitably bored to receive, in a sliding sealed relationship, the piston rod 84 of the piston 83 which is reciprocable within the chamber of the cylinder element 81. The fluid working portion of the cylinder 81, between its sealed end 81 and the piston 83 is in fluid communication by means of the threaded terminal 82 with the fluid conduit 18 which communicates with the sliding selector valve portion 59 of the control valve 13.

The operation of the control system and its compensating and regulating means are as follows: The cable runs 32 and 33 are initially stressed or tensioned to the predetermined rigging load which for purposes of this description will be set at a load of 60 pounds which has been found satisfactory in a number of installations, but which of course is subject to adjustment as varying conditions may warrant. This pretensioning or application of the predetermined rigging load to the control cables is preferably accomplished with the quadrant arms 20 and 21 and the associated links 24 and 25 in a divergent or spread condition, which may be approximately that shown in Fig. 1. The tensioning of the control cables 32 and 33 to the rigging load of 60 pounds produces a corresponding fluid pressure within the cable tension sensing cylinders 15 and 16, as well as in the cable tensioning cylinder 22. These pressures are correspondingly transmitted by means of the conduits 18, 19 and 26, to the respective ports on the control valve 13. If the control wheel 10 now be moved forwardly, or from right to left in Fig. 1, in order to lower the elevator 36, or rotate the same in the clockwise direction about its pivotal mounting 37, the force transmitted from the control wheel 10 through its piston shaft 11 causes displacement of the central piston 40 and the floating piston 43 (see Fig. 2). Such movement causes displacement of fluid through the port 46 and the passage 49 with a corresponding increase in fluid pressure as the fluid is compressed between the central piston 40 and the floating piston 42, which, in the case of movement in this direction, does not float but is held in its terminal position by engagement with the end of the cylinder 41. The increased fluid pressure on the guide pin or plunger 51 causes displacement of the slide valve 39 toward the right in Fig. 2 and also causes the fluid to be passed through the valve from the port 46 between the central portion of the valve and the outer land 50 through the outlet 55 and into the hydraulic line 14 to the control valve 13. This movement of the control wheel 10 and column 9 builds up a fluid pressure, corresponding to the control force or aerodynamic load on the elevator 36, in both the load sensing cylinder 12 and the control valve 13.

Referring now to Figs. 3 and 4, this increased pressure within conduit 14 and the outer chamber 62 of the body portion 58 of the valve 13, corresponding to the control force or aerodynamic load on the elevator, tends to displace (with the assistance of the spring 64) the camming piston 66 toward the left in Fig. 4. The camming piston 65 cannot be moved by this pressure farther to the left inasmuch as it bears against the shouldered portion of its bore. Application of the control force, however, to the control column 9 (causing counterclockwise rotation of the column, its bracket portion 9a, the quadrant arms 20 and 21, as well as the tensioning cylinder 22 and associated linkage 23—24—25), also produces at the same time an increase in the tension of the control cable 32 which is reflected in an increase in the fluid pressure within the cable tension sensing cylinder 16 and hydraulic conduit 19. Referring again to Figs. 3 and 4, this increased pressure within the conduit 19 is transmitted through the passageway 75, and being exerted against the guide pin portion 80, causes the slide valve 73 to be operated to permit the pressure to be transmitted across the valve and through the port 78 into the central pressure chamber 76.

The aforementioned fluid pressure within the outer chamber 62 is developed at about the same time as that within the central fluid chamber 76, and the oppositely operating camming valves 65 and 66 in effect make a comparison of these two pressures, namely, the aerodynamic load pressure in chamber 62 acting upon the camming valve 66 aided by the lighter spring 64 and the cable tension sensing pressure within the central chamber 76 acting upon the adjacent camming valve 65 opposed by the stronger spring 63. Accordingly, the piston valves 65 and 66 compare the aerodynamic load pressure with that sensed by the cable tension sensing cylinder 16, and if the latter is too high it will cause the camming piston 65 to move toward the right in Fig. 4, thereby compressing the spring 63 and causing the plunger pin 68 to be deflected outwardly. This causes opening of the valve 69 and permits some of the fluid within the tensioning cylinder 22 to pass out through the conduit 26 past the opened ball valve 69 and into the return line 27 to thereby relieve the pressure within the cylinder 22. Under this condition of the pressure within the central chamber 76 being too much higher than that within the outer chamber 62, this excess pressure exerted at the end of the other camming piston 66 has no effect on the latter inasmuch as it bears against the shouldered portion within the valve body and cannot be moved farther outwardly from the central pressure chamber. Accordingly, the pressure supply valve 72 is not opened and the fluid displaced from the cylinder 22 through the conduit 26, the relief valve 69, and the return line 27, goes to the reservoir 28 and is not replaced by any flow from the pressure side of the system.

Conversely, in the event a comparison of the pressures within the outer chamber 62 and the central chamber 76 by the piston valves 65 and 66, reveals that the pressure within the outer chamber 62 is too high, this pressure acts in collaboration with the spring 64 to move the piston valve 66 to the left toward the central pressure chamber 76 without imparting any movement to the other piston valve 65, which bears against its shouldered casing portion. This latter condition wherein the piston valve 66 is caused to move to the left in Fig. 4 arises from an excess of pressure in the outer chamber 62, or a lowering of the pressure within the central chamber 76, indicating that the aerodynamic load force is too much higher than the tension within the cable as sensed by the cylinder 15 or 16 and requires replenishment from the pressure supply line 31. Accordingly, movement of the piston valve 66 toward the left, causes its camming portion to move the plunger pin 71 outwardly thereby opening the ball valve 72 against the opposition of its spring 72a. This permits fluid to pass from the pressure line 31 through the ball valve 72 and into the line 26 which is in communication with the cable tensioning cylinder 22, thereby restoring the tension of the cables to the predetermined and desired magnitude.

By a correct proportioning of the piston areas, the control column lever arm length and the spring rates, the pressure at 62 in the outer chamber of the control valve 13 plus the force of the springs 63 and 64 should be equal to the pressure within the central chamber 76. For example, a 100 pound control force exerted by the pilot against the control wheel 10 will create a tension in the corresponding run of the control cable equivalent to this 100 pound plus the rigging load of 60 pounds. This 160 pound load is transmitted through the lines 18 or 19, depending upon the direction of rotation of the control column 9, and thence through the slide valve 73 to the central pressure chamber 76 against the piston valves 65 and 66. This control force applied by the pilot, added to the force of the springs 63 and 64, balances the load on the piston valves 65 and 66, so that the line 26 leading to the tensioning cylinder 22 is kept closed, thus maintaining the desired rigging load. However, should the control cables become slack due to structural deflection of some nature or for other reasons, a reduced rigging load will then be sensed by a lower pressure within the central chamber 76. A 100 pound control force exerted by the pilot then results in less than 160 pounds at the chamber 76 such that the spring 64 will cause movement of the piston valve 66, thereby opening the pressure supply line 31 to the line 26 to the quadrant spreading cylinder 22, thus increasing the rigging load until the camming piston 66 is returned to shut-off the pressure valve 72. It will be understood that a similar action reduces the rigging load when the column is rocked in the opposite direction, this time by the cooperative action of the piston valve 65.

It will be understood that, while an embodiment has been selected herein which included the elevator of an airplane, the invention is equally applicable to a rudder or other control surface of an airplane or other vehicle. It will also be understood that the invention can be applied to a control stick as distinguished from the control column shown, or to any other control instrumentality such as a wheel, rudder pedals, lever or other manually operated means.

Other forms and modifications of the present invention both with respect to its general arrangement and the details of its respective parts, are intended to come within the scope and spirit of the present invention as more particularly defined in the appended claims.

I claim:

1. In aircraft, a movable surface, control mechanism including flexible cables operatively connected to said movable surface for the manual control thereof, adjustable means for varying the tension within said control cables, means for sensing variations in tension within said control cables, and control valve means for sensing control forces applied to said control mechanism and control valve means for automatically comparing the forces sensed by said cable tension sensing means and said control force sensing means for initiating adjustment of said cable tensioning means.

2. In a control system, a movable control surface, mechanism including control cables operatively connected with said control surface for manually controlled movements thereof, said operating mechanism including a pivotally mounted control member, hydraulic means operatively associated with said control member for adjustment of the tension in said control cables, means for applying a predetermined rigging tension within said control cables, hydraulic means operatively associated with said control cables and said control member for sensing the tension forces developed within said control cables, hydraulic means operatively associated with said control member for sensing the control forces applied thereto, a source of fluid pressure, and hydraulic means for automatically subjecting said cable tensioning means to increased pressure from said fluid pressure source initiated by a predetermined relationship of the hydraulic pressures sensed by said cable tension sensing means and said control force sensing means.

3. In a control system, a movable control surface, control cables operatively connected to said control surface, a manual control member operatively associated with said control cables for operation of said control surface, means for applying a rigging tension to said control cables, means for sensing manual control forces applied to said control member, means operatively associated with said control member and said control cables for sensing the control and rigging tension applied to said control cables and fluid-actuated valve means for automatically adjusting the tension within said control cables incident to variations in a predetermined relationship between the forces sensed by said cable tension sensing means and said control force sensing means.

4. In a control system, a movable surface, control cables operatively connected to said movable surface, operating mechanism connected to said control cables, fluid-actuated means for adjusting the tension within said control cables, fluid-actuated means for sensing variations in tension within said control cables, fluid-actuated means for sensing the control forces applied to said operating mechanism and fluid-actuated control valve means for automatically adjusting said cable tension means upon the fluid actuation of said control valve means by said cable tension sensing means and said control force sensing means.

5. In a control system, a movable control surface, a manual control member, flexible means interconnecting said control member with said control surface for the operation thereof, means including a pair of fluidly opposed elements for applying a rigging tension to said flexible means, and fluid actuated means operatively associated with said control member and said flexible means for automatically adjusting the tension within said flexible means incident to the forces developed within said flexible means by controlling the fluids to said opposed elements while a control force is applied to said control member.

6. In a tension compensating device for an aircraft control system, a movable control surface, flexible means connected to said control surface, a pivotally mounted control member connected to said flexible means for the manual operation of said control surface, adjustable means for applying a rigging tension to said flexible means, means for sensing the tension within said flexible means, means for sensing the control force applied to said control member, and a control valve actuated by the sensing means for said flexible means and the sensing means for said control member arranged to adjust the rigging load within said flexible means while the same is under a control loading.

7. In a control system, a pair of control cables connected to a control surface, a control member pivotally mounted for rocking movements about a pivotal axis, a pair of quadrant arms each mounted for separate freely pivotal movements about said pivot axis, a pair of pivotal links separately pivotally connected at their outer terminals to said respective quadrant arms, said pivotal links having an intermediate pivotal connection, a fluid-actuated device pivotally connected between said control member pivot axis and said intermediate pivot carried by said pivotal links, said control cables extending around rounded portions of said quadrant arms, and piston-cylinder means interposed between the terminals of said control cables and said control member arranged such that fluid pressure within said fluid-actuated device causes relative movement of said quadrant arms for the tensioning of said control cables and said tensioning is sensed by the fluid within said piston-cylinder means.

8. A valve for a tension regulator comprising a valve body having a pair of fluid chambers formed therein, a pair of bores interconnecting said fluid chambers, spring-pressed camming pistons arranged for reciprocal movements within said bores, the camming portions of said pistons arranged in opposite directions, a relief valve operatively associated with the camming portion of a first of said pistons, a pressure supply valve operatively associated with the camming portion of the second of said pistons, a first of said fluid chambers being subject to pressures caused by control forces, the second of said chambers being subjected to fluid pressures caused by rigging and control forces arranged in such manner that when the pressure within the first chamber exceeds by a predetermined amount the pressure within said second chamber, the camming portion of one of said pistons actuates said pressure supply valve for the application of additional pressure to compensate for variations in said rigging and control forces.

9. In a control valve mechanism, a pair of fluid chambers, a pair of cylindrical bores interconnecting said fluid chambers, a first of said chambers in communication with a force transmitting fluid line, the second of said chambers arranged to be placed in communication with a fluid-actuated control, a spring-biased piston having a camming portion reciprocally arranged within a first of said bores, a second spring-biased piston having a camming portion reciprocally arranged within the second said bore, the camming portions of said pistons being oppositely disposed, a source of fluid pressure, and a valve operatively associated with one of said piston camming portions arranged to open said fluid pressure source when the fluid pressure within said first chamber exceeds by a predetermined amount the pressure within said second fluid chamber for increased pressure to said fluid-actuated control.

10. In a control system, a movable control surface, control cables operatively connected to said control surface, a manual control member operatively associated with said control cables for operation of said control surface, means for applying a rigging tension to said control cables, means for sensing the manual control forces applied to said control member, means operatively associated with said control member and said control cables for sensing the control and rigging tension applied to said control cables, and valve means operatively connected to said cable tension sensing means and said control force sensing means for automatically adjusting the tension within said control cables.

11. In a control system, a movable control surface, control cables operatively connected to said control surface, a pivotally mounted manual control member operatively associated with said control cables for operation of said control surface, means carried by said control member for applying a rigging tension to said control cables, means for sensing manual control forces applied to said control cables by operation of said control member, means operatively associated with said control member and said control cables for sensing the control and rigging tensions applied to said control cables, and force comparing means operatively connected to said cable tension sensing means and to said control force sensing means for automatically adjusting the tension within said control cables.

12. A valve for a tension regulator for a system subjected to variations in rigging and control forces comprising a valve body having a pair of fluid chambers formed therein, a pair of bores interconnecting said fluid chambers, spring-pressed camming pistons arranged for reciprocable movements within said bores, the camming portions of said pistons arranged in opposite directions, relief means operatively associated with the camming portions of a first of said pistons, pressure supply means operatively associated with the camming portion of the second of said pistons, a first of said fluid chambers being subject to pressures caused by control forces, the second of said chambers being subjected to fluid presures caused by rigging and control forces developed within said system arranged in such manner that when the pressure within the first said chamber exceeds by a predetermined amount the pressure within said second chamber the camming portion of one of said pistons actuates said pressure supply means for the application of additional pressure to compensate for variations in said rigging and control forces within said system.

13. A cable tension regulator for a movable member including control cables operatively connected to said movable member, operating mechanism connected to said control cables, fluid-actuated means for adjusting the tension within the said control cables, fluid-actuated means for sensing variations in tension within said control cables, fluid-actuated means for sensing the control forces applied to said operating mechanism and fluid-actuated control valve means automatically adjusting said cable tension means upon the fluid actuation of said control valve means by said cable tension sensing means and said control force sensing means.

14. Cable tension adjusting mechanism including a pair of angularly disposed arms rotatable about a common pivot, a pair of angularly disposed pivotally interconnected links having their opposed terminals pivotally interconnecting said arms, said arms having portions engaging oppositely deflected portions of a control cable, means for anchoring the terminals of said control cable, and fluid-actuated means pivotally interconnected between said common pivot and the pivotal interconnection between said pair of links for varying said angular disposition of said cable engaging arms for varying the tension of said cables.

15. Cable tension adjusting mechanism for a cable system including a pair of angularly disposed arms rotatable about a common pivot, a pair of angularly disposed pivotally interconnected links having their opposed terminals pivotally interconnecting said arms, said arms having portions engaging spaced cable portions of said cable system, a pair of oppositely disposed tension sensing elements pivotally interposed between said common pivot and the respective terminals of said cables, an extensible element pivotally interconnected between said common pivot and the pivotal interconnection between said pairs of links for the tensioning of said cable portions, and automatic means initiated by variations within said tension sensing elements for adjusting the extension of said extensible tensioning element for the automatic adjustment of the tension of said cable portions.

16. A control system comprising a movable control column, a pair of control cables, a control surface arranged to be moved by said control cables upon the application of control forces to said control column, a fluid motor carried by said control column arranged for the tensioning of both of said control cables, fluid means carried by said control column arranged to sense the control forces applied to said column, further fluid means arranged to separately sense the tension developed within each of said control cables, and control valve means in fluid communication with said fluid motor and both said fluid means for automatically adjusting said cable tensioning fluid motor.

17. A control system comprising: a control member; a control surface; a cable system including a pair of cables operatively connecting said control member with said control surface; fluid-actuated means operatively associated with said control member for sensing the magnitude of a control force applied to said control member; means for tensioning said cables; means for sensing the magnitude of the tension in each of said cables; means for comparing the magnitude of the control force applied to said control member with the magnitude of the force in the more highly tensioned of said cables; and means initiated by said comparing means for actuating said cable tensioning means.

18. A control system compensating arrangement comprising: a control member; a control surface; a cable system including a pair of cables operatively connecting said control member with said control surface; sensing means including a fluid-actuated unit arranged for actuation in accordance with the magnitude of a control force applied to said control member; tensioning means for stressing each of said cables; means for sensing the magnitude of the tension in each of said cables; means for comparing the magnitude of the control force applied to said control member with the magnitude of the tension and control forces in the more highly tensioned of said cables; and means initiated by said force comparing means for compensating for variations in the magnitude of said forces by actuating said cable tensioning means.

19. A control cable system comprising: a control member; a control surface; a pair of control cables operatively connecting said control member with said control surface; fluid-piston means for sensing the magnitude of a control force applied to said control member; fluid-actuated means for tensioning said cables; fluid-piston means for sensing the magnitude of the tension in each of said cables; spring-biased fluid-piston means for comparing the magnitude of the control force applies to said control member with the magnitude of the force in the more highly tensioned of said cables; and valve means actuated by said spring-biased force comparing means for actuating said fluid-actuated tensioning means for the adjustment of said cable tensioning means.

20. In a control system including: a control member; a control surface; a pair of cables operatively connecting said control member with said control surface; fluid means for sensing the magnitude of a control force applied to said control member; fluid means for tensioning each of said cables; fluid means for sensing the magnitude of the tension in each of said cables; the improvement of spring-biased fluid-piston means for comparing the magnitude of the control force applied to said control member with the magnitude of the force in the more highly tensioned of said cables; and valve means initiated by said spring-biased force comparing means for adjusting said cable tensioning means.

GENE R. MYERS.

References Cited in the file of this patent

UNITED STATES PATENTS

| Number | Name | Date |
|---|---|---|
| 2,280,105 | Sturgess | Apr. 21, 1942 |
| 2,405,377 | Sturgess et al. | Aug. 6, 1946 |
| 2,424,198 | Tauscher | July 15, 1947 |
| 2,581,080 | Cushman | Jan. 1, 1952 |